(12) United States Patent
Ball et al.

(10) Patent No.: US 8,788,683 B2
(45) Date of Patent: Jul. 22, 2014

(54) SCALABLE TRANSCODING FOR STREAMING AUDIO

(75) Inventors: Simon Ball, Carlisle, MA (US); Adrian Roe, Eastleigh Hants (GB); Dom Robinson, East Sussex (GB); Steve Strong, Malaga (ES)

(73) Assignee: The NASDAQ OMX Group, Inc., New York, NY (US)

( * ) Notice: Subject to any disclaimer, the term of this patent is extended or adjusted under 35 U.S.C. 154(b) by 208 days.

(21) Appl. No.: 13/211,831

(22) Filed: Aug. 17, 2011

(65) Prior Publication Data

US 2013/0046896 A1    Feb. 21, 2013

(51) Int. Cl.
    G06F 15/16    (2006.01)
(52) U.S. Cl.
    USPC ........... 709/228; 709/227; 709/230; 709/246; 709/247; 714/4.1; 714/4.12; 718/1; 718/104
(58) Field of Classification Search
    None
    See application file for complete search history.

(56) References Cited

U.S. PATENT DOCUMENTS

| | | | |
|---|---|---|---|
| 6,934,279 B1 | 8/2005 | Sollee et al. | |
| 7,158,539 B2 * | 1/2007 | Zhang et al. | 370/473 |
| 7,640,303 B2 | 12/2009 | Blumofe | |
| 7,937,487 B2 * | 5/2011 | Dunbar et al. | 709/231 |
| 8,332,688 B1 * | 12/2012 | Tompkins | 714/13 |
| 8,424,022 B2 * | 4/2013 | Stokes et al. | 719/321 |
| 8,433,050 B1 * | 4/2013 | Baten et al. | 379/202.01 |
| 2008/0311888 A1 * | 12/2008 | Ku et al. | 455/414.1 |
| 2012/0317299 A1 * | 12/2012 | Sathianathan et al. | 709/231 |

OTHER PUBLICATIONS

H. Andres Lagar-Cavilla, et al., SnowFlock: Virtual Machine Cloning for Cloud Computing, presented at EuroSys 2009 Conference, Nuremberg, Germany, Apr. 1-3, 2009.

* cited by examiner

*Primary Examiner* — Thu Nguyen
*Assistant Examiner* — Nam Tran
(74) *Attorney, Agent, or Firm* — Nixon & Vanderhye P.C.

(57) ABSTRACT

Systems and techniques for capturing audio and delivering the audio in digital streaming media formats are disclosed. Several aspects of the systems and techniques operate in a cloud computing environment where computational power is allocated, utilized, and paid for entirely on demand. The systems and techniques enable a call to be made directly from a virtual machine out to a Public Switch Telephone Network (PSTN) via a common Session Interface Protocol (SIP) to PSTN Breakout service, and the audio to be delivered onward to one or more Content Delivery Network (CDN). An audio call capture interface is also provided to initiate and manage the digital streaming media formats.

42 Claims, 4 Drawing Sheets

SCALABLE TRANSCODING FOR STREAMING AUDIO

TECHNICAL FIELD

This disclosure relates generally to streaming data, and more particularly to scalable transcoding for streaming audio.

BACKGROUND

Generally, a communications platform that transforms audio into an integrated streaming audio webcast is known in the art. End-users are able to participate in the audio webcasts from anywhere on the Internet using just a standard web browser, with the audio being streamed to the user. Streaming media is a type of Internet content that can be played while still in the process of being downloaded. A user's computer can play the first packet of an audio stream, decompress the second, while receiving the third. As such, an end-user can listen to a webcast without waiting until the end of content transmission. Streaming media quality can vary widely according to the type of media being delivered, the speed of the user's Internet connection, network conditions, content encoding, and the format used.

Typically, the media's server, client, and production and encoding tools developed by a streaming software vendor are collectively referred to as a format, Streaming media encoded in a particular format is provided by that format's media server and can be replayed using that format's client. Media clients are also often referred to as 'players', and typically exist as plug-ins to Web browsers. Example players include, but are not limited to, Windows Media®, Real Player®, Apple QuickTime® and Adobe Flash®.

Audio webcasts have been used for several years by companies to communicate with investors and security analysts. For example, on Oct. 23, 2000, the Securities and Exchange Commission (SEC) adopted Regulation FD (Fair Disclosure) which provides that when an issuer, or person acting on its behalf, discloses material nonpublic information to certain enumerated persons (in general, securities market professionals and holders of the issuer's securities who may well trade on the basis of the information), it must make public disclosure of that information. Various companies have conformed to Regulation FD by disclosing material nonpublic information to the public using audio webcasts.

Turning now to FIG. 1, a typically audio webcast will be discussed. To begin, at step 10, a customer wishing to initiate a webcast contacts a call provider to schedule an event. At step 12, the call provider, who typically operates an event registration system for scheduling the event, enters the event information into the registration system. Then, at step 14, the call provider confirms the event information and sends the customer a provider Web site address, an event identifier, and a user name and password to use to initiate the conference call. At step 15, either the vendor and/or call provider transmits invitation messages to prospective end-users. The messages are typically included in an e-Mail and include the event identifier sent to the customer, as well as a link to a content distribution Web site. At step 16, the prospective end-users receive the notification. Lastly, at step 18, to access the event, an end-user selects the link included in the e-Mail (or enters a URL manually) to launch his or her browser's media player to listen to the event. To connect and listen to an event, the end-user typically requires a computer with a hardware sound card and Internet connection, an Internet browser (Internet Explorer or Netscape Navigator, or the like), streaming media player (e.g., Windows Media Player, RealPlayer or the like) and the Web site address of the event. At the Web site address of the event, the end-user may enter the event identifier, user name (if required) and password (if required) to access the event. Of course, one or more of the above-described steps can be carried out in a different manner. At any one point in time, several hundred individuals may participate in an audio webcast and multiple audio webcasts, as described in connection with FIG. 1, can occur simultaneously to disseminate material nonpublic information and other information.

Traditional webcast systems, however, have several deficiencies. For example, these systems typically operate on a single computer server, which represents a single point of failure and limits scalability, i.e., the number of users that can listen to the audio of the event. Moreover, the prior art systems require advanced setup for the content streams requiring a significant investment in both computer and telephony infrastructure equipment. Such systems and resources required include, without limitation, racks of telephony equipment, media encoders, storage, network connectivity, and the like. Moreover, this infrastructure is required to be maintained twenty four (24) hours, seven (7) days a week for three hundred and sixty five (365) days in readiness for service. Furthermore, the capacity of this infrastructure needs to exceed the highest possible peak of demand, even if average demand only utilizes a fraction of the equipment. As a consequence, prior art webcast systems require physical production facilities that have inherent cost and scaling issues.

These and other problems of prior art webcast systems are addressed by the present invention.

SUMMARY

Systems and techniques for capturing audio and delivering the audio in digital streaming media formats are disclosed. Several aspects of the systems and techniques operate in a cloud computing environment where computational power is allocated, utilized, and paid for entirely on demand. The systems and techniques enable a call to be made directly from a virtual machine out to a Public Switch Telephone Network (PSTN) via a common Session Interface Protocol (SIP) to PSTN Breakout Service, and the audio to be delivered onward to one or more Content Delivery Network (CDN). An audio call capture interface is also provided to initiate and manage the digital streaming media formats.

Various aspects of the invention relate to streaming and encoding audio using a cloud computing environment. For example, according to one aspect, a method of streaming information includes establishing a set of connections between a first PSTN breakout service and a set of machines. A first machine in the set of machines is a first virtual machine instantiated in a first cloud computing environment, the first PSTN breakout service being connected to a conference call. The method also includes receiving a digital data stream in at least one machine in the set of machines, the digital data stream having been encoded according to a first encoding protocol, encoding the digital data stream to generate an encoded digital data stream, the encoding being done according to a second encoding protocol, and transmitting the encoded digital data stream to a content delivery network (CDN).

In one embodiment, the method includes receiving the digital data stream over one of the set of connections between the first PSTN service and the first virtual machine, encoding the digital data stream on the first virtual machine, and transmitting the encoded digital data stream from the first virtual machine to the CDN. The method may also include receiving the digital data stream at a second virtual machine, encoding the digital data stream on the second virtual machine, and transmitting the encoded data stream from the second virtual machine to the CDN.

The second virtual machine may be instantiated in the first cloud computing environment or a second cloud computing environment that is different from the first cloud computing environment. In addition, the method may include instantiating the first virtual machine in response to a request from a call control interface module. In one embodiment, the method includes instantiating the second virtual machine from at least one of the call control interface module and the first virtual machine.

In one embodiment, the method includes receiving the digital data stream at the second virtual machine from the first virtual machine. In another embodiment, the method includes receiving the digital data stream at the second virtual machine from the first PSTN breakout service. In yet another embodiment, the method includes receiving the digital data stream from a second PSTN breakout service, the second PSTN breakout service being connected to the conference call.

The method may include transmitting the digital data stream to the second virtual machine from the first PSTN breakout service upon at least one of a failure and delay in one of the data connections between the first data connection and the first virtual machine. The digital data stream may be received using a speech codec, such as G.722, G.719, G.711 or SPEEX.

In one embodiment, the method includes providing a session initiation protocol (SIP) application in each of the first and second virtual machines for receiving and managing the digital data stream in the first encoding protocol, and providing at least one audio encoder for encoding the digital data stream into the second encoding protocol.

The method may also include providing an operating system (OS) audio bus for transmitting the digital data stream in each of the first and second virtual machines, the OS audio bus being a software audio driver. In one embodiment, the software audio driver is a Windows Driver Model (WDM) audio driver. The method may also include encoding the digital data stream into a Windows Media Audio (WMA) file.

The method may further include providing a plurality of audio encoders for encoding the digital data stream into at least one third encoding protocol different from the first encoding protocol and the second encoding protocol, encoding the digital data stream using the third encoding protocol, and transmitting the encoded digital data stream according to the third protocol to the CDN. In one embodiment, a first encoder of the plurality of audio encoders is a Windows Media encoder and a second encoder of the plurality of audio encoders is a Flash Media encoder. The method may also include encoding the digital data stream into a Flash Media audio file.

The method may also include providing an audio server in each of the first and second virtual machines, the audio server transmitting the encoded digital data stream to the CDN. In one embodiment, the audio server is a flash media server and the encoded digital data stream is a flash media file.

In yet another embodiment, the method further includes generating, from the SIP Application, an MP3 audio file from the received digital data stream in the first encoding format, and storing the MP3 audio file in a data store associated with each of the first and second virtual machines. The method may further include audio scrubbing the MP3 audio file.

Systems, methods, as well as articles that include a machine-readable medium storing machine-readable instructions for implementing the various techniques, are disclosed. Details of various implementations are discussed in greater detail below.

Additional features and advantages will be readily apparent from the following detailed description, the accompanying drawings and the claims.

BRIEF DESCRIPTION OF THE DRAWINGS

Like reference symbols in the various drawings indicate like elements.

DETAILED DESCRIPTION

Figure 1:
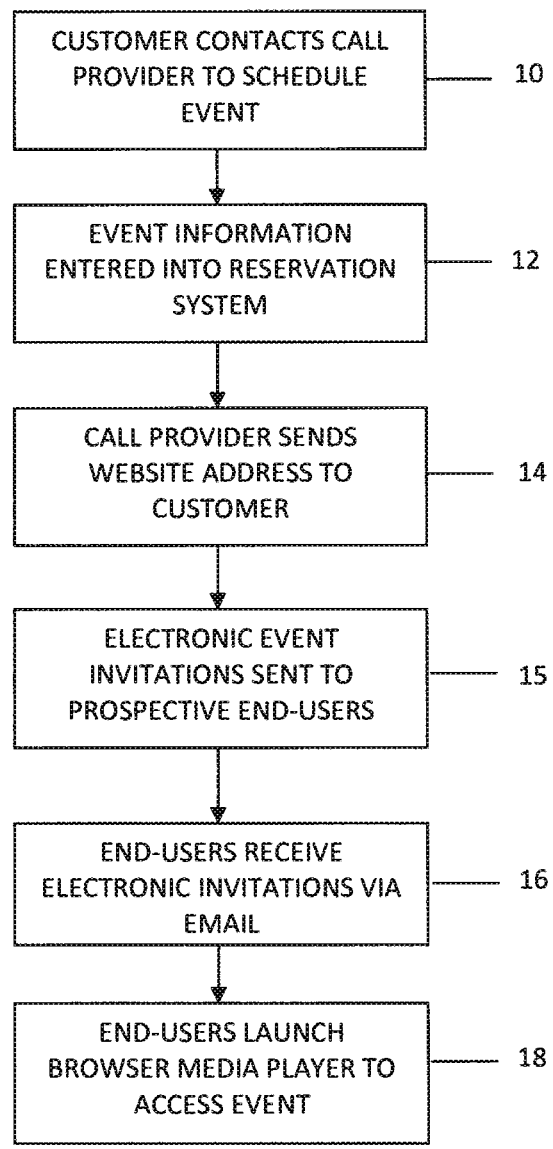
FIG. 1 is an example method of initiating and conducting an audio conference cast in accordance with the prior art.
Figure 2:
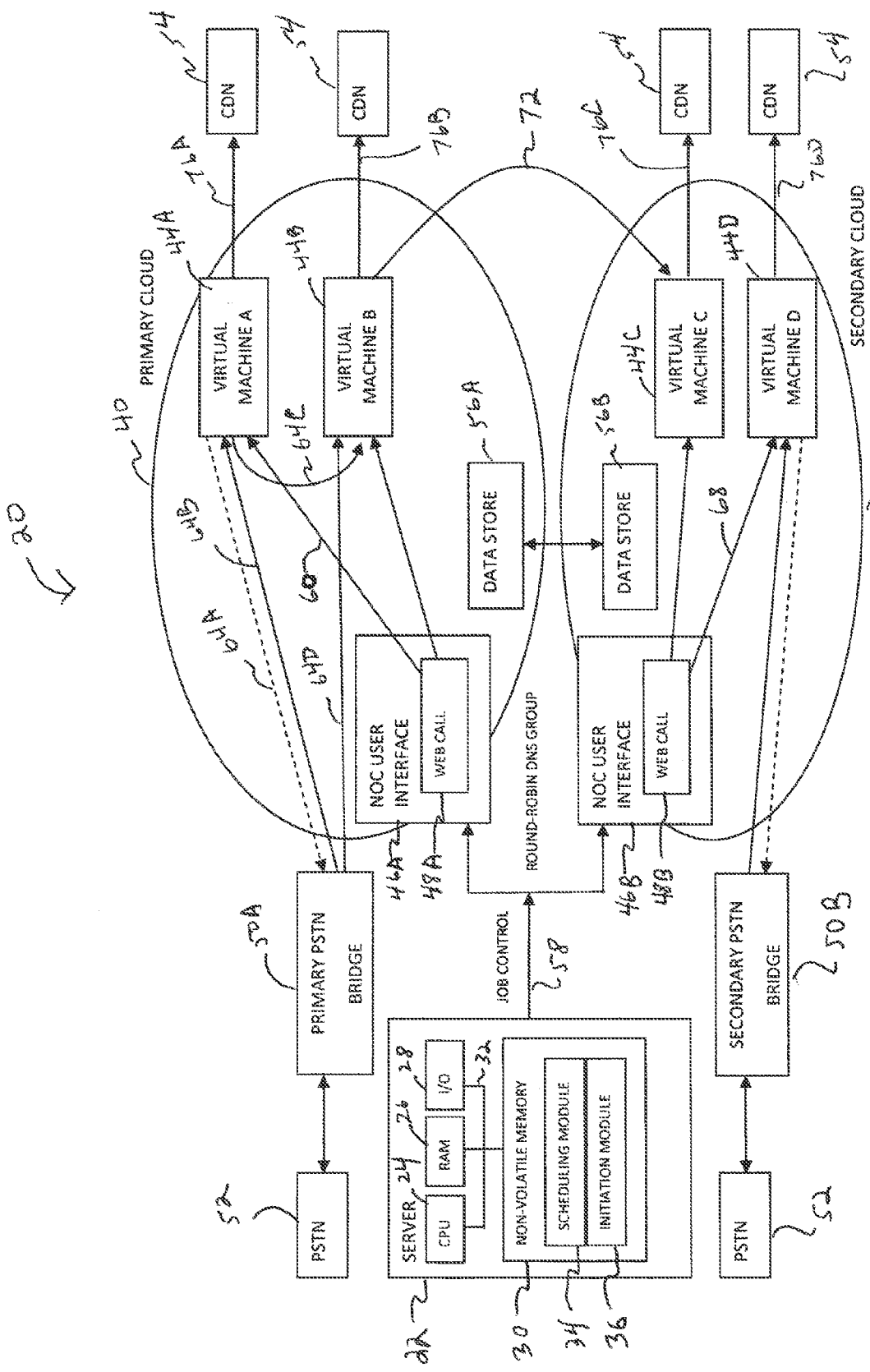
FIG. 2 is a schematic of an example transcoding system according to one embodiment of the present invention.

Turning now to FIG. 2, an example of a suitable computing system 20 for capturing conference call audio via a Public Switch Telephone Network (PSTN) 52 and delivering the conference call audio in streaming media formats to one or more content distribution networks (CDN) 54 is disclosed. The computing system 20 is only one example and is not intended to suggest any limitation as to the scope of use or functionality of the invention. The computing system 20 should not be interpreted as having any dependency or requirement relating to any one or combination of illustrated components.

For example, the present invention is operational with numerous other general purpose or special purpose computing consumer electronics, network PCs, minicomputers, mainframe computers, laptop computers, as well as distributed computing environments that include any of the above systems or devices, and the like, at least some of which may be configured in cloud computing environments.

The invention may be described in the general context of computer-executable instructions, such as program modules, being executed by a computer. Generally, program modules include routines, programs, objects, components, data structures, loop code segments and constructs, etc. that perform particular tasks or implement particular abstract data types. The invention can be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

As shown in the FIG. 2 example, the system 20 includes a server device 22 configured to include a processor 24, such as a central processing unit ('CPU'), random access memory ('RAM') 26, one or more input-output devices 28, such as a display device (not shown) and keyboard (not shown), and non-volatile memory 30, all of which are interconnected via a common bus 32 and controlled by the processor 24.

In one embodiment, the server device 22 is in operative communication with a plurality of cloud computing environments 40, 42 collectively configured with a plurality of virtual machines 44A-D. The server device 22 provides a control plane (e.g., job control) via link 58 and includes a scheduling module 34 that is used to schedule events, such as audio conference calls, and an initiation module 36 for instantiating the virtual machines 44A-D, network operation center (NOC) user interfaces 46A, 46B, and data stores 56A, 56B in each cloud environment 40, 42.

The data stores 56A, 56B shown in FIG. 2 are a repository that stores state information concerning each virtual machine 44A-D, respectively, operating in each respective cloud environment 40, 42. In one embodiment, the data stores 56A, 56B are relational databases configured in each cloud computing environment 40, 42. Database replication is implemented across each of the databases 56A, 56B. In another embodiment, the data stores 56A, 56B are directory servers, such as a Lightweight Directory Access Protocol ('LDAP') that are replicated across each cloud computing environment 40, 42. In yet another embodiment, the data stores 56A, 56B 34 are an area of non-volatile memory 30 of the server device 22 that are replicated.

As known in the art, cloud computing environments provide ubiquitous, convenient, on-demand network access to a shared pool of configurable computing resources (e.g., networks, servers, storage, applications, and services) that can be rapidly provisioned and released with minimal management effort or service provider interaction. Accordingly, each of the cloud computing environments 40, 42 shown in FIG. 2 provide computational power that can be supplied, utilized, and paid for entirely on demand. Although there are only two cloud computing environments 40, 42 shown in the FIG. 2 schematic, it will be appreciated by one skilled in the art that the present invention is not limited to using two cloud computing environments 40, 42 and may utilize one or more cloud computing environments. Advantageously, by utilizing a plurality of cloud computing environments, as shown in the FIG. 2 example, additional system redundancy and resiliency may be achieved. By way of example and in no manner limiting, example cloud computing environments used with the present invention may include Amazon EC2®, Rackspace® and GoGrid®.

Each of the NOC user interfaces 46A, 46B includes a web call module 48A, 48B, respectively, that provides management and control of their virtual machines. As shown in the FIG. 2 example, in one embodiment, the NOC user interfaces 46A, 46B are distributed across a number of virtual machines and clouds sharing a same Domain Name system (DNS). Advantageously, by distributing the NOC user interfaces 46A, 46B across virtual machines sharing the same DNS, a round-robin technique of data store updates may be achieved. For example, if during an audio webcast one of the virtual machines processing the audio becomes unreachable, connections to a next internet protocol (IP) address in a DNS list of the DNS may be made resulting in increased resiliency of the system. In addition, in one embodiment, each call module 48A, 48B implements database replication of the data stores 56A, 56B to ensure that whichever virtual machine assumes audio webcast processing, all virtual machines of the system receive the instructions that have been sent over the job control signal via link 58 and have information concerning the state of all virtual machines in the cloud environments 40, 42. Advantageously, by utilizing this technique, any of the web call modules 48A, 48B and/or cloud environments 40, 42 may be impaired or disabled with minimal or no interruption of scheduled or active conference webcasts.

For example, referring to the primary cloud environment 40 of FIG. 2, the call module 48A transmits a signal via link 60 to 'Virtual Machine A' 44A to dial a Primary Public Switch Telephone Network (PSTN) bridge 50A via link 64A (e.g. a PSTN Breakout Service) to connect to the PSTN 52. Example PSTN Breakout Services include, but are not limited to, SiP-Gate®, VoIPTalk™, and VoIPfone™. The Primary PSTN bridge 50A dials out via a link to the PSTN 50 and returns a SIP audio signal via link 64B to the Virtual Machine A 44A. The Virtual Machine A 44A in turn transmits the received audio signal in a streaming encoded format via a signal carried on link 76A to the content delivery network (CDN) 54. In one embodiment, as discussed in connection with FIG. 3 below, the Virtual Machine A 44A is configured to include a PSTN Bridge/Session Initiation Protocol (SIP) client that, as shown in FIG. 2 via link 64C, relays the received audio signal to 'Virtual Machine B' 44B. Virtual Machine B 44B may then encode and stream the received audio signal in an encoded format via a link 76B to the CDN 54. In the event there is a problem with Virtual Machine A, the Primary PSTN Bridge 50A automatically transmits the SIP audio signal via link 64D to Virtual Machine B 44B, which continues to transmit the encoded audio signal to the CDN 54 via link 76B.

In one embodiment, if there is a performance issue with the primary cloud environment 40, Virtual Machine B 44B transmits a relay signal via link 72 of the received audio signal to 'Virtual Machine C' 44C in the secondary cloud computing environment 42. Virtual Machine C 44C then processes the audio signal in a manner similar to Virtual Machine B 44B and transmits/streams the encoded audio signal to the CDN 54 via link 76C.

As shown in the FIG. 2 example, in one embodiment, to further ensure system availability if there are performance issues with the primary cloud environment 40, the web call module 48B of the secondary cloud computing environment 42 transmits a signal via link 68 to 'Virtual Machine D' 44D to dial a Secondary Public Switch Telephone Network (PSTN) bridge 50B to connect to the PSTN 52 with the resulting audio being made available to the CDN 54 as a completely discrete path available as soon as the NOC User Interface 46B connects the audio conference call to the source conference call.

Advantageously, the system 20 provides failover safety if 1) Virtual Machine A 44A fails to maintain a conference call, 2) the primary cloud environment 40 and/or Virtual Machine A 44A fail or have performance issues, and/or 3) the signal is not transmitted via link 64C from Virtual Machine A 44A to Virtual Machine B 44B. In particular, if any of the before-mentioned situations occur, local failover to Virtual Machine B 44B occurs quickly ensuring there is a continuous audio source. In addition, the relay signal transmitted via link 72 from Virtual Machine B 44B to Virtual Machine C 44C ensures that a second virtual machine in a second cloud computing environment is activated, reducing the risk that faulty clouds may cause an outage.

Moreover, by Virtual Machine D 44D initiating a second call through the Secondary PSTN Bridge 50B, additional redundancy and resiliency may be achieved. While the NOC User Interface 46B may need to clear security to join the conference call on the PSTN 52, which may take a few minutes, this action is initiated as soon as Virtual Machine C 44C is activated as a backup to Virtual Machine B 44B. As such, should Virtual Machine A 44A have failed because the primary cloud environment 40 is failing, by the time Virtual Machine B 44 fails to transmit the signal via link 72 to Virtual Machine C 44C, Virtual Machine D 44D is already active and streaming an encoded audio stream signal via link 76D to the CDN 54, which may be included as an alternative option in a CDN playlist.

Figure 3:
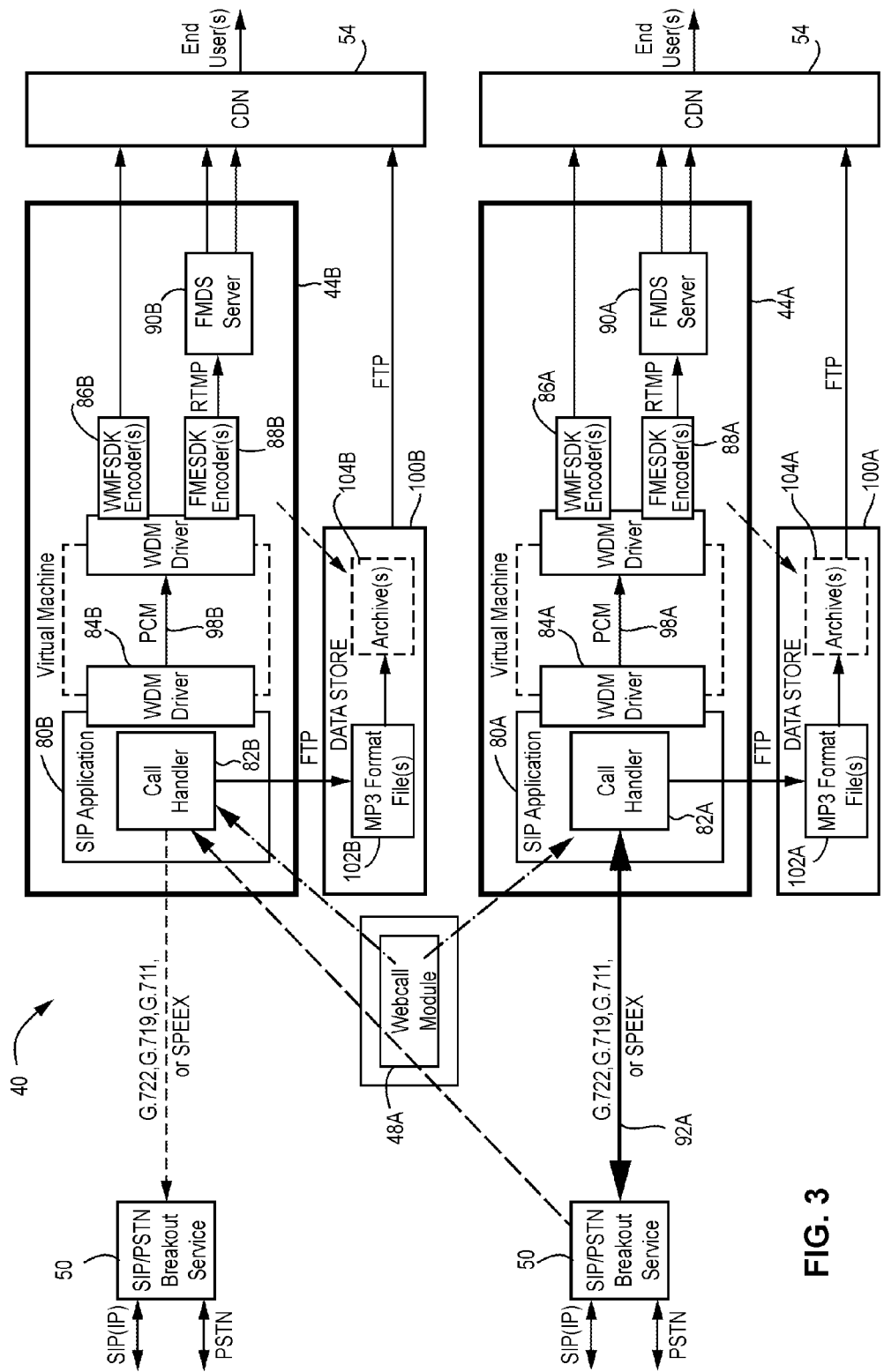
FIG. 3 is a schematic of virtual machines included in the example transcoding system of FIG. 2.

Turning now to FIG. 3, a schematic of component modules included in the primary cloud environment 40 of FIG. 2 is disclosed. As shown in the FIG. 3 example, in one embodiment, a plurality of clone (e.g., replica) virtual machines, indicated by Virtual Machine A 44A and Virtual Machine B 44B, are instantiated by a web call module 48A in the primary cloud environment 40. Initially, the plurality of virtual machines 44A, 44B shares the same initial state.

As shown in FIG. 2, each virtual machine 44A, 44B is configured to include a Session Initiation Protocol (SIP) Application 80A, 80B, respectively, having a call handler module 82A, 82B, respectively, configured to dial a PSTN Breakout Service 50. As known in the art, a PSTN Breakout Service provides a platform for transporting Voice over Internet Protocol (VoIP) media between IP networks and a PSTN. In one embodiment, as shown in FIG. 3, Virtual Machine A 44A establishes a communication signal via link 92A with the PSTN Breakout Service 50 to dial the PSTN to join a conference call. An audio signal of the conference call is then transmitted back to Virtual Machine A 44A over the communication link 92A. As discussed previously, Virtual machine A 44 may also transmit the received audio signal to Virtual Machine B 44B which in turn, transmits an encoded audio stream to the CDN 54. Example communication protocols used for receiving and transmitting audio signals between each call handler 82A, 82B and the PSTN Breakout Service 50 may include, but are not limited to, G.722, G.719, G.711, SPEEX and GSM.

In one embodiment, each of the call handler modules 82A, 82B, upon receiving digital audio signals, compresses the sound sequence included therein into a digital audio encoding format. In one embodiment, the digital audio encoding format uses a form of lossy data compression, such as an MP3 encoding format. Each call handler module 82A, 82B then transmits each respective MP3 encoded format file to a data store 100A, 100B, respectively, in the primary cloud 40 using file transfer protocol (FTP). In one embodiment, an audio scrub module (not shown) is provided that may be applied to the MP3 file to improve the quality of the audio file. Upon completion of the conference call and/or audio file scrubbing, as shown in FIG. 3, each MP3 encoded format file 102A, 102B may be archived in archives 104A, 104B, respectively, and then transmitted via links 114A, 114B, respectively, to the CDN 54 using FTP.

In one embodiment, as shown in the FIG. 3 example, each Virtual Machine 44A, 44B may be configured to include a Windows Driver Model (WDM) audio device driver 84A, 84B, respectively. Each WDM audio device driver 84A, 84B is configured to operate as an Operating System (OS) audio bus that provides audio converter and splitter functionality resulting in an audio card simulation in each Virtual Machine 44A, 44B. As shown in the FIG. 3 example, the received digital audio signal may be encoded into an uncompressed audio format via links 98A, 98B, such as PCM.

Each of uncompressed audio formats 98A, 98B may be then provided to respective Windows Media Format Software Development Kit (WMFSDK) encoders 86A, 86B included in each Virtual Machine 44A, 44B. The WMFSDK encoders 86A, 86B encode the uncompressed audio into an Advanced Systems Format (ASF) and transmit/stream the encoded files via links 106A, 106B, respectively, to the CDN 54 using Hypertext Transfer Protocol (HTTP). As shown in the FIG. 3 example, each Virtual Machine 44A, 44B may also include a Flash Media Encoder Software Development Kit (FMESDK) 88A, 88B for encoding the uncompressed audio format into an encoded flash audio format. In one embodiment, output audio streams from each FMESDK 88A, 88B are transmitted to a Flash Media Development Server (FMDS) 90A, 90B via a Real Time Messaging Protocol (RTMP) (e.g., a protocol developed by Adobe Systems, Incorporated, for streaming audio and other types of media). Each FMDS 90A, 90B then streams the flash encoded audio formats to the CDN 54 using RTMP and RTMP digital video record (DVR) techniques.

Figure 4:
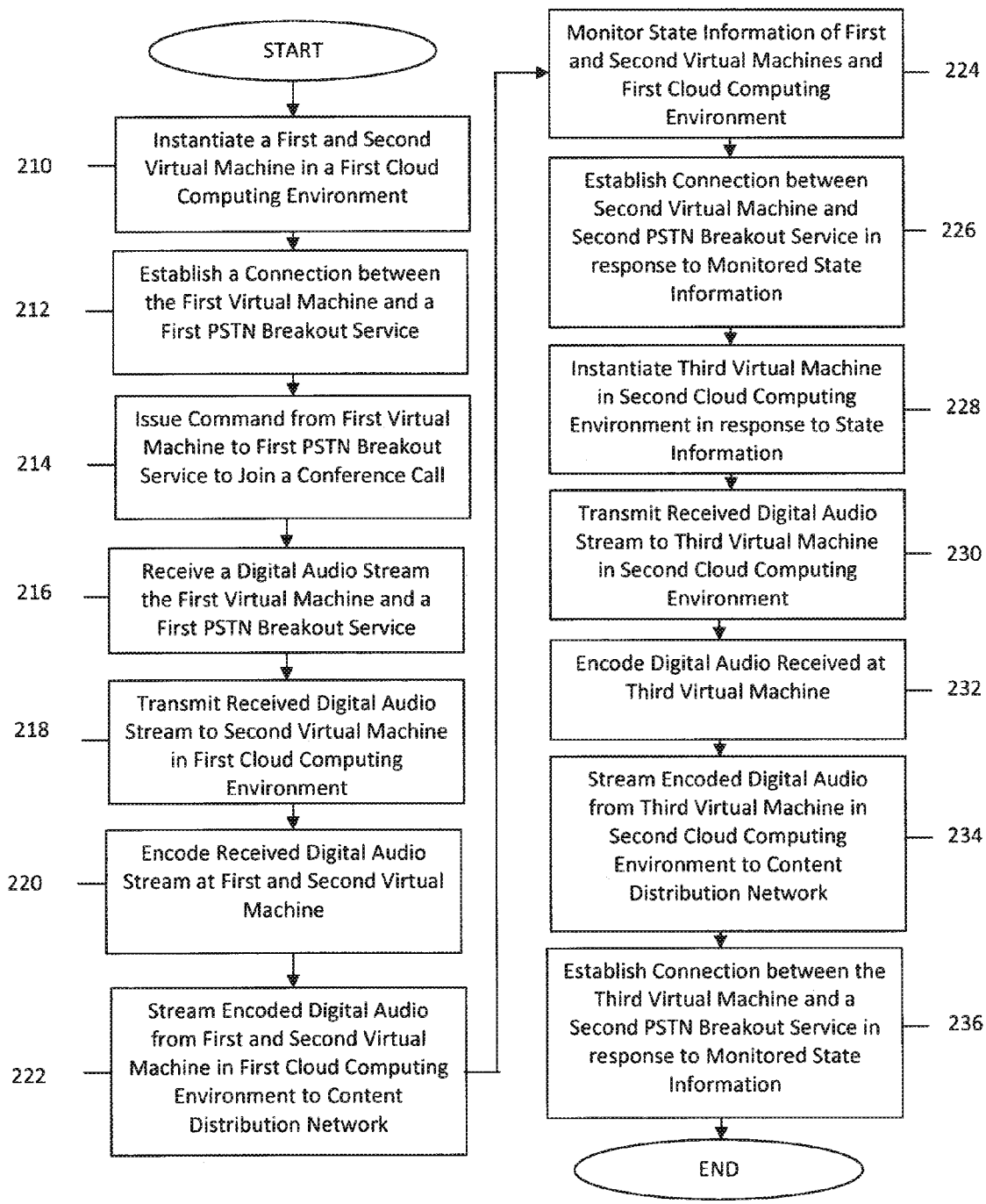
FIG. 4 illustrates an example method of capturing conference call audio and delivering the conference call audio in streaming media formats according to one embodiment of the present invention.

Turning now to FIG. 4, an example method of capturing conference call audio and delivering the conference call audio in streaming media formats is disclosed. First, at step 210, a first and second virtual machine is instantiated in a first cloud computing environment by the webcall module of the NOC interface. Next, at step 212, a call handler module of a SIP application included in a first virtual machine establishes a connection to a first PSTN Breakout Service. Next, at step 214, the call handler module issues a command to the PSTN Breakout Service to join a conference call. Once the first PSTN Breakout Service joins the conference call, at step 216, the call handler module receives a digital audio stream of the conference call. At step 218, the first virtual machine then relays the received digital audio stream to the second virtual machine. Then, at step 220, the first and the second virtual machines encode the received digital audio. Next, at step 222, the first and second virtual machines stream the encoded digital audio in various media formats to a CDN for playing in a browser by an end user. In one embodiment, the encoded media formats include, but are not limited to, a Windows Media Audio format, a Flash Audio format, and a MP3 audio format.

As described previously, in one embodiment, each call handler module in response to receiving the digital audio from the PSTN Breakout Service may generate and transmit a MP3 encoded format file to a data store using file transfer protocol (FTP). The MP3 file may then be audio scrubbed by an audio scrub module to improve the quality of the audio file. Upon completion of the conference call and/or audio file scrubbing, the MP3 encoded format file may be archived and then transmitted via a link to the CDN using FTP.

In one embodiment, at step 224, the method includes monitoring state information of the first and second virtual machine, as well as the first cloud computing environment. The state information may relate to processing throughput. In the event of a delay or failure associated with the first virtual machine or first PSTN Breakout Service, at step 226, the second virtual machine may establish a connection with a second PSTN Breakout Service to join the conference call, receive and encode the digital audio, and continue streaming the encoded digital stream to the CDN.

At step 228, the method may include the webcall module instantiating a third virtual machine in a second cloud computing environment in response to state information associated with either the first virtual machine, second virtual machine, or first cloud computing environment. As discussed previously, additional virtual machines may be established in either the first or second cloud computing environments and the present invention is not limited to the number of virtual machines depicted or described in FIGS. 2-4. In the event a third virtual machine is instantiated in the second cloud computing environment, at step 230, either the first or second virtual machine may transmit their received digital audio stream to the third virtual machine. At step 232, the third virtual machine encodes the received digital audio and at step 234, streams the encoded digital audio from the third machine in the second cloud computing environment to the CDN. In one embodiment, as shown at step 236, the third virtual machine may also establish a connection with a second PSTN Breakout Service to receive the digital audio and transmit the received digital audio to additional virtual machines for added system redundancy and resiliency.

Various features of the system may be implemented in hardware, software, or a combination of hardware and software. For example, some features of the system may be implemented in one or more computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

What is claimed is:

1. A method of streaming information comprising:
    establishing a set of connections between a first public switched telephone network (PSTN) breakout service and a set of machines, a first machine in the set of machines being a first virtual machine instantiated in a first cloud computing environment, the first PSTN breakout service being connected to a conference call;
    receiving a digital data stream in the first virtual machines, the digital data stream having been encoded according to a first encoding protocol, wherein the digital data stream is received over one of a set of connections between the first PSTN breakout service and the first virtual machine;
    audio encoding the digital data stream on the first virtual machine to generate an encoded digital data stream, the encoding being done according to a second encoding protocol;
    transmitting the encoded digital data stream from the first virtual machine to a content delivery network (CDN);
    receiving the digital data stream encoded according to the first encoding protocol at a second virtual machine, and when an event affects a performance of the first virtual machine, audio encoding the digital data stream on the second virtual machine to generate an encoded digital data stream, the encoding being done according to the second encoding protocol, and transmitting the encoded data stream from the second virtual machine to the CDN; and
    providing a session initiation protocol (SIP) application in each of the first and second virtual machines for receiving and managing the digital data stream in the first encoding protocol.

2. The method of claim 1, wherein the SIP application in the first virtual machine relays the received audio signal to the second virtual machine.

3. The method of claim 1, wherein the second virtual machine is instantiated in the first cloud computing environment or a second cloud computing environment different from the first cloud computing environment.

4. The method of claim 1, further comprising instantiating the first virtual machine in response to a request from a call control interface module.

5. The method of claim 4, comprising instantiating the second virtual machine from at least one of the call control interface module and the first virtual machine.

6. The method of claim 1, comprising receiving the digital data stream at the second virtual machine from the first virtual machine.

7. The method of claim 1, comprising receiving the digital data stream at the second virtual machine from the first PSTN breakout service.

8. The method of claim 1, comprising receiving the digital data stream from a second PSTN breakout service, the second PSTN breakout service being connected to the conference call.

9. The method of claim 1, comprising transmitting the digital data stream to the second virtual machine from the first PSTN breakout service upon at least one of a failure and delay in one of the data connections between the first data connection and the first virtual machine.

10. The method of claim 1, wherein the digital data stream is received using a speech codec.

11. The method of claim 10, wherein the codec is selected from the group consisting of G.722, G.719, G.711, SPEEX and GSM.

12. The method of claim 1, further comprising providing an operating system (OS) audio bus for transmitting the digital data stream in each of the first and second virtual machines, the OS audio bus being a software audio driver.

13. The method of claim 12, wherein the software audio driver is a Windows Driver Model (WDM) audio driver.

14. The method of claim 1, comprising encoding the digital data stream into a Windows Media Audio (WMA) file.

15. The method of claim 1, further comprising:
    providing a plurality of audio encoders for encoding the digital data stream into at least one third encoding protocol different from the first encoding protocol and the second encoding protocol;
    encoding the digital data stream using the third encoding protocol; and
    transmitting the encoded digital data stream according to the third protocol to the CDN.

16. The method of claim 15, wherein a first encoder of the plurality of audio encoders is a Windows Media encoder and a second encoder of the plurality of audio encoders is a Flash Media encoder.

17. The method of claim 16, comprising encoding the digital data stream into a Flash Media audio file.

18. The method of claim 1, further comprising providing an audio server in each of the first and second virtual machines, the audio server transmitting the encoded digital data stream to the CDN.

19. The method of claim 18, wherein the audio server is a flash media server and the encoded digital data stream is a flash media file.

20. The method of claim 1, further comprising: generating, from the SIP Application, an MP3 audio file from the received digital data stream in the first encoding format; and storing the MP3 audio file in a data store associated with each of the first and second virtual machines.

21. The method of claim 20, further comprising audio scrubbing the MP3 audio file.

22. A system for streaming information comprising:
    a call processor configured to initiate a set of connections between a first public switched telephone network (PSTN) breakout service and a set of machines,
    a first machine in the set of machines being a first virtual machine instantiated in a first cloud computing environment, the first PSTN breakout service being connected to a conference call;
    the first virtual machine including:
        a receiver configured to receive a digital data stream having been encoded according to a first encoding protocol;
        an audio encoder configured to encode, according to a second encoding protocol, the digital data stream to generate an encoded digital data stream;

a transmitter configured to transmit the encoded digital data stream to a content delivery network (CDN), wherein the first virtual machine is configured to encode the digital data stream on the first virtual machine in response to receiving the digital data stream over one of the set of connections between the PSTN breakout service and the first virtual machine, and a transmitter configured to transmit the encoded digital data stream from the first virtual machine to the CDN, and a second virtual machine including:

a receiver configured to receive the digital data stream having been encoded according to the first encoding protocol;

an audio encoder configured to encode, according to a second encoding protocol, the digital data stream to generate a second encoded digital data stream, when an event affects a performance of the first virtual machine; and a transmitter configured to transmit the encoded data stream from the second virtual machine to the CDN, a session initiation protocol (SIP) application included in each of a respective one of the first and second virtual machines, which when implemented by the respective virtual machine, causes the respective virtual machine to receive and manage the digital data stream in the first encoding protocol.

23. The system of claim 22, wherein the SIP application is configured in the first virtual machine to relay the received audio signal to the second virtual machine.

24. The system of claim 22, wherein the second virtual machine is instantiated in the first cloud computing environment or a second cloud computing environment different from the first cloud computing environment.

25. The system of claim 22, comprising means for instantiating the first virtual machine in response to a request from a call control interface module.

26. The system of claim 25, comprising means for instantiating the second virtual machine from at least one of the call control interface module and the first virtual machine.

27. The system of claim 22, comprising means for receiving the digital data stream at the second virtual machine from the first virtual machine.

28. The system of claim 22, comprising means for receiving the digital data stream at the second virtual machine from the first PSTN breakout service.

29. The system of claim 22, comprising means for receiving the digital data stream from a second PSTN breakout service, the second PSTN breakout service being connected to the conference call.

30. The system of claim 22, wherein the digital data stream is transmitted to the second virtual machine from the first PSTN breakout service upon at least one of a failure and delay in one of the data connections between the first data connection and the first virtual machine.

31. The system of claim 22, wherein the digital data stream is received using a speech codec.

32. The system of claim 31, wherein the codec is selected from the group consisting of G.722, G.719, G.711, SPEEX and GSM.

33. The system of claim 22, further comprising an operating system (OS) audio bus for transmitting the digital data stream in each of the first and second virtual machines, the OS audio bus being a software audio driver.

34. The system of claim 33, wherein the software audio driver is a Windows Driver Model (WDM) audio driver.

35. The system of claim 22, comprising means for encoding the digital data stream into a Windows Media Audio (WMA) file.

36. The system of claim 22, further comprising a plurality of audio encoders in which a first encoder of the plurality of encoders encodes the digital data stream into at least one third encoding protocol different from the first encoding protocol and the second encoding protocol, and transmits the encoded digital data stream according to the third protocol to the CDN.

37. The system of claim 36, wherein the first encoder of the plurality of audio encoders is a Windows Media encoder and a second encoder of the plurality of audio encoders is a Flash Media encoder.

38. The system of claim 36, wherein the digital data stream is encoded into a Flash Media audio file.

39. The system of claim 22, further comprising an audio server in each of the first and second virtual machines, the audio server configured to transmit the encoded digital data stream to the CDN.

40. The system of claim 39, wherein the audio server is a flash media server and the encoded digital data stream is a flash media file.

41. The system of claim 22, wherein the SIP Application generates an MP3 audio file from the received digital data stream in the first encoding format, and stores the MP3 audio file in a data store associated with each of the first and second virtual machines.

42. The system of claim 41, further comprising means for audio scrubbing the MP3 audio file.

* * * * *